United States Patent [19]

van der Linde

[11] 4,398,953

[45] Aug. 16, 1983

[54] CAR WAXES WITH IMPROVED WATER-BEADING DURABILITY

[75] Inventor: Willem B. van der Linde, Cherry Hill, N.J.

[73] Assignee: Borden, Inc., Columbus, Ohio

[21] Appl. No.: 314,971

[22] Filed: Oct. 26, 1981

[51] Int. Cl.³ .............................................. C08H 9/08
[52] U.S. Cl. ....................................... 106/10; 106/11; 106/271; 106/272
[58] Field of Search ...................... 106/10, 8, 11, 271, 106/272

[56] References Cited

U.S. PATENT DOCUMENTS 3,393,078 7/1968 Lockhart et al. ........................ 106/8
3,508,933 4/1970 Yates ..................................... 106/10
3,847,622 11/1974 Brandl et al. ......................... 106/10

Primary Examiner—John Kight, III
Assistant Examiner—Amelia B. Yarbrough
Attorney, Agent, or Firm—George P. Maskas; Kenneth P. Van Wyck

[57] ABSTRACT

The invention is directed to an improved, silicone-containing, oil-in-water emulsion, paste polish composition especially suited for use on cars and exhibiting improved water-beading durability. The composition is comprised of montan wax, an emulsifier, silicone oil, amino silicones, finely-divided abrasive, water, volatile aliphatic hydrocarbon liquid, and optionally, pigment. The improvement comprises using a volatile aliphatic hydrocarbon liquid having an evaporation rate approximately three to five times faster than the evaporation of water.

7 Claims, 1 Drawing Figure

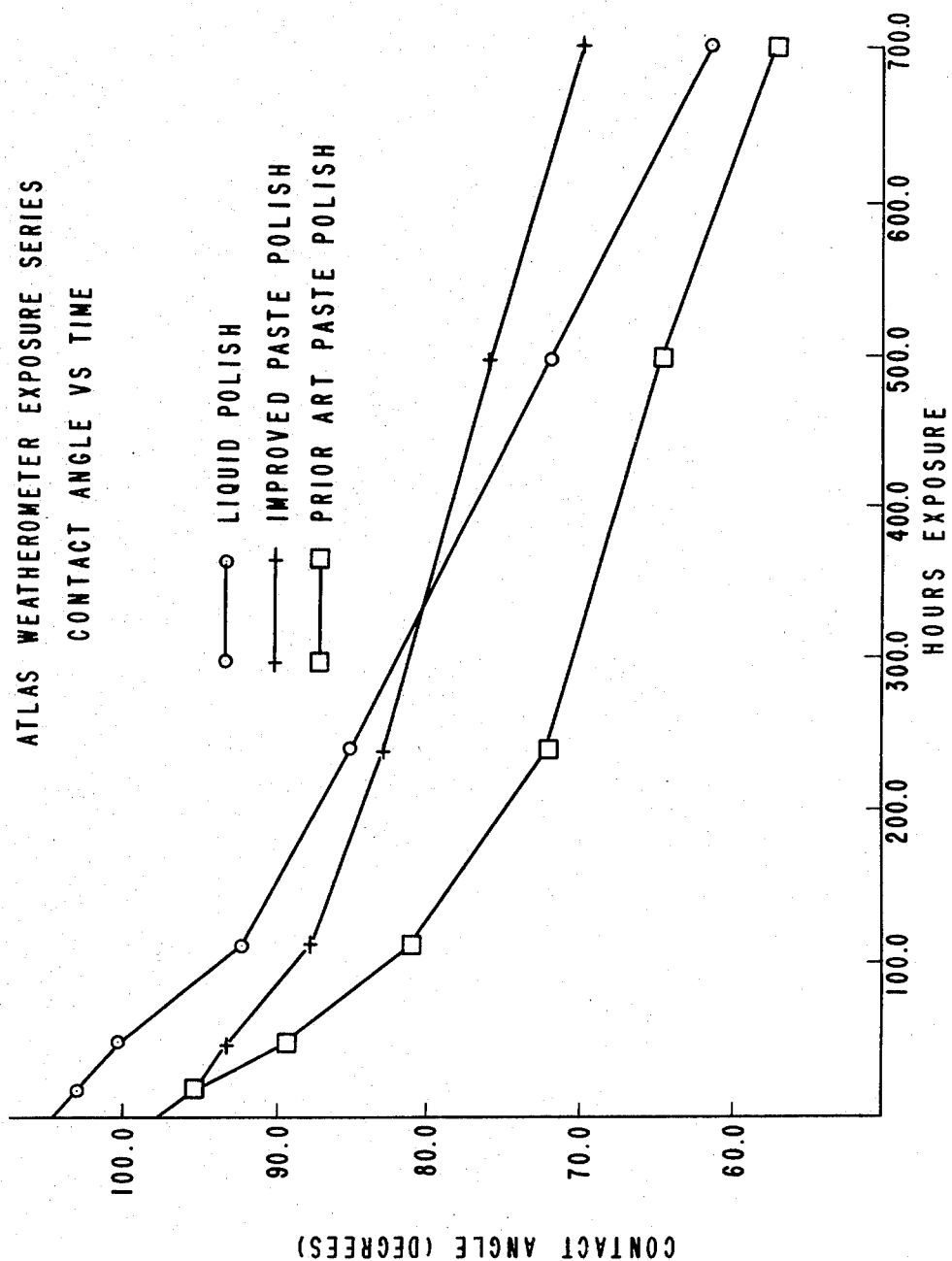

4,398,953

CAR WAXES WITH IMPROVED WATER-BEADING DURABILITY

BACKGROUND OF THE INVENTION

This invention relates to an improved, silicone-containing, oil-in-water emulsion, paste polish composition especially suited for use on cars, wherein the improvement relates to water-beading durability. Silicone-containing polish compositions are well known and have been widely used. For a description of a representative silicone-containing water emulsion, polish composition, see U.S. Pat. No. 3,393,078, issued July 16, 1968 to Lockhart and Patrick. The specific type of polish to which the present invention applies is of the kind comprising a montan wax, an emulsifier, silicone oil, amino silicones, finely-divided abrasive, water, a volatile aliphatic hydrocarbon liquid, and optionally, pigment, wherein the ratio of hydrocarbon liquid to water is about 3 to 1 so that the workable viscosity of the polish composition is like that of mayonnaise (paste polish) as contrasted with coffee cream (liquid polish).

It was known that the water-beading durability of any silicone-containing polish composition is related to the amount of silicone left behind after buffing. However, it was discovered that a significant difference in water-beading durability existed between the paste and liquid formulations of the specific kind of silicone-containing polish described earlier, even though each contained the same amount of silicone. Specifically, the liquid displayed superior water-beading durability. The present invention provides for an improved *paste* polish formulation exhibiting enhanced water-beading durability.

SUMMARY OF THE INVENTION

There is provided by the present invention an improved silicone-containing, oil-in-water emulsion, paste polish composition especially suited for use on cars, of the kind comprising montan wax, an emulsifier, silicone oil, amino silicones, finely-divided abrasive, water, a volatile aliphatic hydrocarbon liquid, and optionally, pigment, wherein the improvement comprises utilizing a volatile aliphatic hydrocarbon liquid having an evaporation rate approximately three to five times faster than the evaporation rate of water.

BRIEF DESCRIPTION OF THE DRAWING

The sole FIGURE of the drawing is a graphic representation of the improved water-beading durability performance of a paste polish of the present invention as compared to prior art.

DETAILED DESCRIPTION OF THE INVENTION

As mentioned in the Background section, a significant difference had been noted in the water-beading durability of the paste and liquid formulations of the kind of silicone-containing polish to which, in its paste formulation, the present invention applies. In attempting to isolate the reason for the liquid's superior performance, it was unexpectedly discovered that if the abrasives used in this type of silicone-containing polish were removed from the *paste* formulation, the resultant water-beading durability of the paste polish improved dramatically. This suggested that there is an interaction between the silicone and abrasives in the paste that is desirable to minimize.

The abrasives in both the liquid and paste formulations of such silicone-containing polishes described earlier, are contained in the water phase, while the amino silicones are dispersed in the organic phase. In the liquid polish composition, the ratio of the organic hydrocarbon liquid to water is almost 1 to 1, based on the percentage weight of the two respective ingredients to the combined weight of *all* the ingredients. In contrast, this ratio of hydrocarbon solvent to water in the paste polish composition is about 3 to 1. The solvent used in the liquid formulation and in an unimproved paste formulation has an evaporation rate about the same as water. Hence, after drying and before buffing, the unimproved paste polish leaves a mostly solvent-based dispersion on the car surface while in the liquid polish, a higher concentration of water is retained in the "dried" residue on the car surface. It was hypothesized that this retention of water in the liquid formulation keeps the abrasives wet, thus reducing the interaction between the amino silicones, which are dispersed in the organic phase, and the abrasives. Thus, more silicone is left behind after buffing, resulting in the observed, enhanced water-beading durability of the liquid formulation.

Applicant has discovered that by incorporating into the paste polish formulation, a hydrocarbon solvent with an evaporation rate much faster than water, the resulting "dried" residue of such an improved paste polish is *not* a mostly solvent-based dispersion as was left by the unimproved paste polish. Rather, solvent with an evaporation rate three to five times faster than water leaves the applied polish before most of the water, so that, like the liquid formulation, a higher concentration of water is retained in the "dried" residue on the car surface. Consequently, as the abrasives stay surrounded by water longer, it is hypothesized that the interaction between the abrasives and the amino silicones is reduced during buffing, thus explaining the measurable improvement in water-beading durability that is observed. See the accompanying drawing.

The drawing graphically illustrates the improved water-beading durability performance of a paste polish of the present invention as compared to prior art pastes. The water-beading durability is measured as a function of Contact Angle vs. Time. The X-axis represents the number of hours of exposure in the Atlas Weatherometer Exposure Series, to which a sample panel treated with polish has been subjected. The Atlas Weatherometer Exposure Series involves subjecting a specimen material to artificial and accelerated weathering tests which simulate natural weathering, by the use of controlled cycles of ultraviolet radiation, light, water, and heat. After specified intervals of exposure, the water-beading capability of the tested polishes was ascertained by measuring the contact angle of water droplets on the sample panel surface. This angle is represented on the Y-axis. The contact angle, which is measured in degrees, is such that it will be greater for closer-to-perfect "beads" or drops, i.e., those that are more rounded. In contrast, those water droplets that are more spread out, i.e., less rounded or less "beadlike", will have smaller contact angles.

From the drawing, it is clear that the water-beading durability of an improved paste polish of the present invention is superior to that of a prior art paste polish outside the present invention. The improved paste provides enhanced beading for a longer time. Indeed, the improved paste even provides beading superior to the liquid polish after long periods of weathering.

The improved paste polish composition of this invention is a dispersion of oil and abrasives in water. The basic constituents are a montan wax, an emulsifier, silicone oil, amino silicones, finely-divided abrasive, water, a volatile aliphatic hydrocarbon having an evaporation rate about three to five times faster than water, and optionally, pigment.

The water comprises 10-25%, preferably 15-20%, by weight, based on the weight of *all* the constituents, of such a polish composition.

A montan wax or combination of montan waxes comprises about 1 to 15% by weight, preferably 2 to 6%, based on the weight of all the constituents, of the composition. Approximately at least three-quarters by weight, based on the weight of the montan wax only, of the montan wax used should be of an oxidized type having an acid number of at least 90, preferably between 120 to 160. The oxidized montan wax can also contain ester groups resulting from the esterification of at least part of the acid groups of the wax, for example, with a polyhydric alcohol or a $C_{16}$ to $C_{30}$ monohydric alcohol. It is known that crude or refined montan wax can be oxidized with an acid, for example, chromic acid, to provide a modified montan wax having a substantial acid value. It is also known that any predetermined amount of the acid groups of an oxidized montan wax can be esterified with various monohydric and polyhydric alcohols. The resulting wax is sometimes referred to in the art as an esterification product of an oxidation product of montan wax.

The improved paste polish of this invention also contains about 0.2 to 5%, preferably 0.5 to 1.5% by weight, of a liquid silicone having a viscosity at 25° C. of about 5,000 to 15,000 centistokes, preferably 8,000 to 12,000 centistokes.

The polish contains about 2 to 10% by weight, preferably about 4 to 8%, of a liquid amino silicone or combination of liquid silicones having a viscosity at 25° C. of about 50 to 2,000 centistokes, preferably 150 to 1,000 centistokes.

The silicone ingredients are polyorgano siloxanes in the form of nonvolatile liquids. They are preferably polydialkylsiloxanes and still more preferably polydimethylsiloxanes.

The polish contains about 30 to 75%, preferably 45 to 60% by weight, based on the weight of all the ingredients, of a mixture of volatile aliphatic hydrocarbon liquids where at least 60%, preferably at least 70% by weight, based on the weight of said volatile hydrocarbon liquids only, of the individual constituents of said mixture have an evaporation rate approximately three to five times faster than that of water. This mixture is preferably a blend of deodorized kerosene, Aromatic Controlled V.M.&P. Naphtha, and an aliphatic hydrocarbon with an evaporation rate between V.M.&P. Naphtha and Mineral Spirits. The ingredient content of such a preferred mixture preferably consists of about 5 to 7% by weight based on the weight of *all* the polish constituents, of deodorized kerosene having a B.R. (boiling range) of about 170° to 272° C., about 7 to 10% by weight of an aliphatic hydrocarbon with an evaporation rate between V.M.&P. Naphtha & Mineral Spirits, having a B.R. of about 130°–182° C., and about 35 to 45% by weight of Aromatic controlled V.M.&P. Naphtha having a B.R. of about 100°–156° C.

A finely-divided mild abrasive is present in the polish in an amount equal to about 5 to 20%, preferably 8 to 18%, based on the weight of all the constituents in the polish composition. This ingredient is preferably an aluminum silicate, however, other known mild abrasives can also be used which are not harmful to the surface to be polished.

An emulsifier is added to the mixing vessel in an amount effective to facilitate the formation of the emulsion as well as to provide the emulsion composition with satisfactory storage stability. A major proportion of the emulsifier present in the polish preferably consists of the product of the in situ reaction (during preparation of the polish) between (a) morpholine and (b) a fatty acid selected from the group consisting of montanic acid, Tall Oil Fatty Acid (TOFA), and mixtures of the two. In a particularly preferred manner of practicing the invention, about 1% by weight, based on the weight of all the polish constituents, of morpholine, about 2% by weight of TOFA, and about 4.3% by weight of an oxidized montan wax containing acid groups are among the ingredients added to the mixing vessel; and during the preparation of the polish the morpholine reacts in situ with the TOFA and the acid groups of the montan wax to form emulsifiers.

The addition of pigments is optionally contemplated in amounts that do not affect functional properties of the polish.

Improved paste polish compositions of the present invention can be applied with a soft cloth or other applicator to the painted exterior and interior surfaces of automobiles and other articles and, after a brief drying period, wiped or buffed with a soft cloth to form a protective coating of high luster with water-beading durability superior to the prior art paste polish compositions.

The invention is further understood by the following example. All quantities shown are percentage weights, based on the weight of all constituents combined, unless otherwise indicated.

EXAMPLE

An improved paste polish of the present invention is prepared from the following ingredients:

| Ingredient: | % Weight Based on Weight of Combined Ingredients |
|---|---|
| (A) Water | 18.26 |
| (B) Morpholine | 1.01 |
| (C) Abrasive | 12.75 |
| (D) Pigment | 0.05 |
| (E) High viscosity silicone | 0.97 |
| (F) Low viscosity silicone | 5.76 |
| (G) Tall Oil Fatty Acid | 1.88 |
| (H) Montan Wax | 4.38 |
| (I) Kerosene | 5.69 |
| (J) Aliphatic Hydrocarbon | 8.37 |
| (K) Aromatic Controlled V.M. & P. Naptha | 40.89 |

In the above formulation, ingredient (B) combines with ingredient (G) to form an emulsifier. Ingredient (G), which is a Tall Oil Fatty Acid (TOFA), has a minimum acid number of 190 and a saponification number of 194 to 198. Ingredient (B) may also combine in part with ingredient (H), again forming an emulsifying agent. Ingredient (H) is a blend of oxidized montan waxes, comprising: 3.41% by weight, based on the weight of *all* the ingredients, of a wax (Hoechst Wax S) having an acid number of 135 to 155 and a melting point of 78° to 83° C.; plus 0.97% by weight, again based on the weight of *all* ingredients, of a wax (Hoechst Wax OP) having an acid number of 10 to 15 and a melting point of 100° to 105° C. Ingredient (C) comprises 10.80% by weight, based on the weight of *all* the ingredients, of an aluminum silicate abrasive and 1.95% by weight, based on the weight of *all* the ingredients, of a fine grain high purity silica ("Novacite L-207A"). Ingredient (D) is a phthalocyanine blue paste comprising 40% solids in water with a non-ionic wetting agent. Ingredient (E) is a polydimethylsiloxane having a viscosity at 25° C. of about 9,700–10,000 centistokes. Ingredient (F) is a blend of an "amino-functional silicone fluid" having a specific gravity of 0.956 to 0.980 at 25° C., and an "amino-functional dimethylpolysiloxane fluid" having a specific gravity of 0.850 to 0.870 at 25° C. and a viscosity of 250 to 1,000 centistokes at 25° C. The blend consists of 3.46% by weight, based on the weight of all the ingredients, of the "amino-functional dimethylpolysiloxane fluid", and 2.30 by weight of the "amino-functional silicone fluid". Ingredient (I) is Kerosene, having a B.R. (boiling range) of about 163° to 292° C. Ingredient (J) is an aliphatic petroleum hydrocarbon with a B.R. of about 130° to 182° C. Lastly, ingredient (K) is an aromatic controlled V.M.&P. Naphtha having a B.R. of about 100° to 156° C.

The improved paste polish of this example is prepared by adding ingredients (A), (D), (B), (C), (E), (J), (I), and (H), in that order to a kettle which is equipped with both a thermal jacket being maintained at 190° F. and an agitator set at 75 rpm. After addition of ingredient (H), the mixture itself is heated to 190° F. and held for 20 minutes at that temperature. Then, ingredient (F) is added, still under 75 rpm agitation, and the resulting mixture is again heated to 190° F. and held for 10 minutes at that temperature. The agitator is stopped at this point and two-thirds (⅔) of ingredient (K) is added, followed by ingredient (G). Then, the final third of (K) is added so that it flushes ingredient (G) out of the line. When addition is completed, the agitator is restarted, set at 100 rpm. It is expected that the temperature will drop to about 160° F. This temperature should be maintained while the composition is agitated at 100 rpm for 15 minutes. At this point, the speed of the agitator is reduced to 75 rpm and the composition is cooled at the maximum rate to about 113° to 118° F. If the temperature should drop below 150° F. upon restarting the agitator after adding (K) and (G), (K) may not properly disperse. In that case, the composition should be reheated to 170° F. and cooled again at the maximum rate. (The dispersion should form at about 160° F.)

The product of this example is useful for polishing automobiles and the like. The directions for use are as follows:
(1) Wash the car. Wipe off any excess water.
(2) Dampen a flannel cloth or equivalent applicator and apply a light coat of the polish to the painted surfaces of the automobile, using circular overlapping strokes.
(3) As the polish dries to a haze, buff off with a clean, dry flannel cloth.

The polish applies easily and buffs easily to a high luster having excellent water-beading durability.

In the claims that follow, all percentages are, unless otherwise specified, percentages by weight, based on the weight of *all* the ingredients in the polish.

What is claimed is:
1. An improved silicone-containing, oil-in-water emulsion, paste polish composition of the kind composed of montan wax, an emulsifier, silicone oil, amino silicones, finely-divided abrasive, water, a volatile aliphatic hydrocarbon liquid, and optionally, pigment, wherein the improvement comprises utilizing in said composition about 10 to 25% by weight, based on the weight of the composition, of water and about 30 to 75% by weight, based on the weight of the composition, of a volatile aliphatic hydrocarbon liquid where at least 60% by weight of said volatile hydrocarbon liquid is a volatile hydrocarbon having an evaporation rate three to five times faster than that of water.

2. An improved paste polish as recited in claim 1, comprising:
(A) about 10 to 25% by weight, based on the weight of *all* the ingredients, of water;
(B) about 1 to 15% by weight of a montan wax;
(C) about 0.2 to 5% by weight of a liquid silicone having a viscosity at 25° C. of about 5,000 to 15,000 centistokes;
(D) about 2 to 10% by weight of an amino silicone liquid having a viscosity at 25° C. of about 50 to 2,000 centistokes;
(E) about 30 to 75% by weight of a volatile aliphatic hydrocarbon liquid where at least 60% by weight, based on the weight of said volatile hydrocarbon liquid only, of said volatile hydrocarbon liquid is a volatile hydrocarbon having an evaporation rate three to five times faster than that of water;
(F) about 5 to 20% by weight of a finely-divided mild abrasive;
(G) an emulsifier in an amount sufficient to facilitate the formation of an oil-in-water emulsion, as well as to provide said oil-in-water emulsion, paste polish composition with satisfactory storage stability; and
(H) optionally, pigment, in an amount that does not affect the functional properties of the polish.

3. An improved paste polish as recited in claim 1, comprising:
(A) about 15–20% by weight, based on the weight of *all* the ingredients, of water;
(B) about 2 to 6% by weight of a montax wax;
(C) about 0.5 to 1.5% by weight of a liquid silicone having a viscosity at 25° C. of about 8,000 to 12,000 centistokes;
(D) about 4 to 8% by weight of an amino silicone liquid having a viscosity at 25° C. of about 150 to 1,000 centistokes;
(E) about 45 to 60% by weight of a volatile aliphatic hydrocarbon liquid where at least 70% by weight, based on the weight of said volatile hydrocarbon liquid only, is a volatile hydrocarbon having an evaporation rate three to five times faster than that of water;
(F) about 8 to 18% by weight of a finely-divided mild abrasive;
(G) an emulsifier in an amount sufficient to facilitate the formation of an oil-in-water emulsion, as well as to provide said oil-in-water emulsion, paste polish composition with satisfactory storage stability; and
(H) optionally, pigment, in an amount that does not affect the functional properties of the polish.

4. An improved paste polish as recited in claims 2 or 3, wherein approximately at least 75% by weight, based on the weight of the montan wax only, of the montan wax has an acid number between about 90 to 160.

5. An improved paste polish as recited in claims 2 or 3, wherein said volatile hydrocarbon liquid having an evaporation rate three to five times faster than that of water, is an aromatic controlled V.M.&P. Naphtha having a Boiling Range of about 100° to 156° C.

6. An improved paste polish as recited in claims 2 or 3, wherein said emulsifier comprises the product of the in situ reaction between (a) morpholine and (b) a fatty acid selected from the group consisting of montanic acid, Tall Oil Fatty Acid (TOFA), and mixtures of the two.

7. An improved paste polish as recited in claim 1, comprising:
- (A) about 18.26% by weight, based on the weight of *all* the ingredients, of water;
- (B) about 3.41% by weight of a montan wax having an acid number of about 135–155;
- (C) about 0.97% by weight of a montan wax having a acid number of about 10–15;
- (D) about 0.97% by weight of a polydimethylsiloxane liquid silicone having a viscosity at 25° C. of about 9,700 to 10,000 centistokes;
- (E) about 3.46% by weight of an amino functional dimethylpolysiloxane liquid amino silicone having a specific gravity of 0.850 to 0.870 at 25° C. and a viscosity of 250 to 1,000 centistokes at 25° C.;
- (F) about 2.30% by weight of an amino-functional silicone fluid having a specific gravity of 0.956 to 0.980 at 25° C.;
- (G) about 40.89% by weight of an aromatic controlled V.M.&P. Naphtha having a Boiling Range (B.R.) between about 100° to 156° C.;
- (H) about 8.37% by weight of an aliphatic hydrocarbon having a B.R. between about 130° to 182° C.;
- (I) about 5.69% by weight of kerosene, having a B.R. between about 163° to 292° C.;
- (J) about 1.01% by weight of morpholine;
- (K) about 0.97% by weight of Tall Oil Fatty Acid;
- (L) about 10.80% by weight of an aluminum silicate;
- (M) about 1.95% by weight of a fine grain, high purity silica; and
- (N) about 0.05% of phthalocyanine blue paste comprising 40% solids in water with a non-ionic wetting agent.

* * * * *